(No Model.)

J. GAMBETTA.
CONSTRUCTION AND PROPULSION OF VEHICLES.

No. 573,214. Patented Dec. 15, 1896.

Witnesses,

Inventor,
John Gambetta

UNITED STATES PATENT OFFICE.

JOHN GAMBETTA, OF STOCKTON, CALIFORNIA.

CONSTRUCTION AND PROPULSION OF VEHICLES.

SPECIFICATION forming part of Letters Patent No. 573,214, dated December 15, 1896.

Application filed December 30, 1895. Serial No. 573,811. (No model.)

*To all whom it may concern:*

Be it known that I, JOHN GAMBETTA, a citizen of the United States, residing at Stockton, county of San Joaquin, State of California, have invented an Improvement in the Construction and Propulsion of Vehicles; and I hereby declare the following to be a full, clear, and exact description of the same.

My invention relates to improvements in the construction and propulsion of vehicles.

It consists in certain details of construction, which will be more fully explained by reference to the accompanying drawings, in which—

Figure 1:
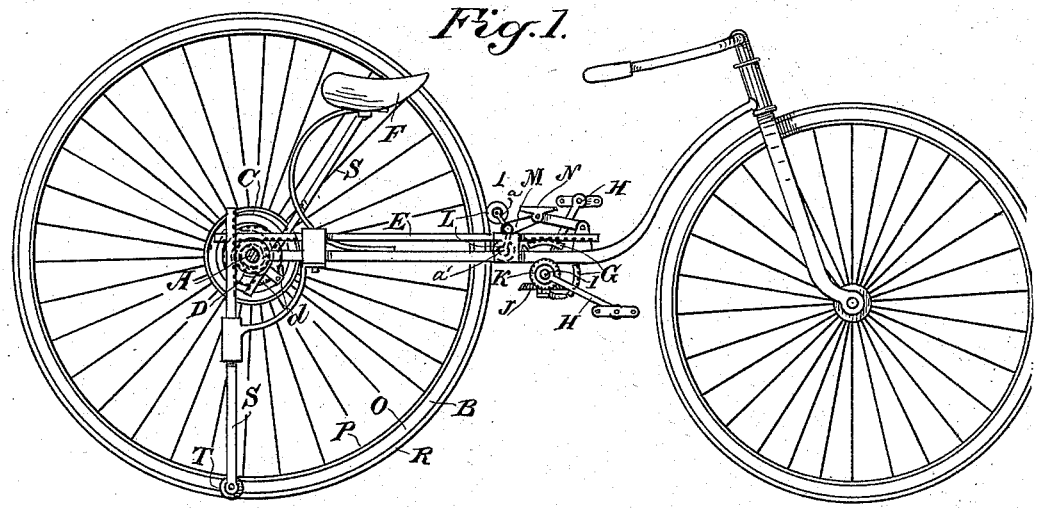
Figure 2:
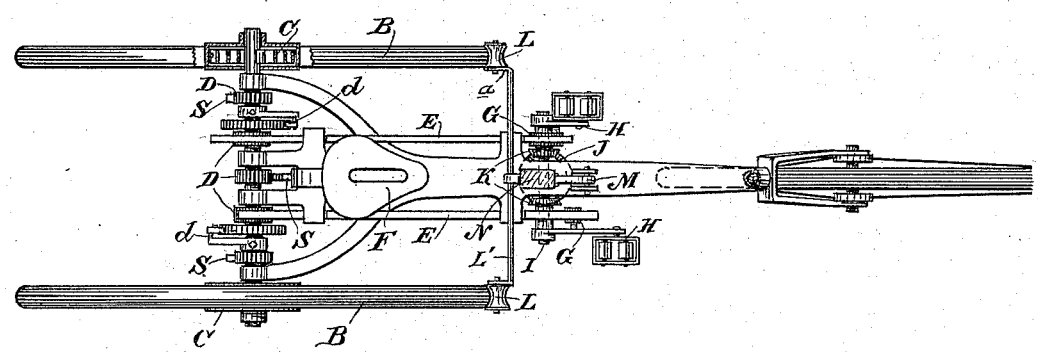

Figure 1 is an elevation of my vehicle, the front wheel being removed. Fig. 2 is a plan of the same.

These improvements may be applied to various forms of vehicles, either driven by mechanical motors or by impulse conveyed through the medium of the feet of the operator or otherwise.

In the present case I have shown the invention as applied to a tricycle adapted to be driven by power applied through the feet of the operator.

A is the main shaft or axle of the machine, having wheels B connected with the shaft through the medium of coiled springs C, the inner ends of which coils are connected directly with the shaft and the outer ends with the interior of suitably-constructed cases surrounding the shaft and which inclose the springs. These springs serve as storage devices for surplus power, which, transmitted through the shaft or axle, will coil the springs up to a greater tension than what is normal to them, and when the application of power ceases or is reduced in force these springs will uncoil and transmit the surplus to the driving-wheels.

Upon the vehicle-shaft are mounted the pinions D, each pinion having a clutch or pawl-and-ratchet mechanism d, which will engage so that the pinion when rotated in a forward direction will act directly to rotate the shaft and propel the vehicle, but when rotated backwardly will be disengaged by reason of the operation of the pawl and ratchet, so as to turn freely. These pinions are engaged by reciprocating rack-bars E, which are suitably guided and retained in contact with the pinions and extend forward beneath the seat or saddle F of the machine to a point where they are to engage the actuating mechanism. The front ends of these rack-bars are also provided with teeth which engage with toothed segments G. These toothed segments are each connected with one of the pedal-cranks H, the inner ends of the cranks being fixed upon the transverse shafts I, suitably journaled upon the frame of the machine.

When one of the pedals is depressed by the impulse of the foot of the person seated upon the saddle, it will rotate its segment G, and this will act to draw the rack-bar E forward, thus applying its power through its pinion D and the pawl-and-ratchet mechanism to rotate the shaft or axle A and the wheels B, which are mounted upon it. Each of the pedals operates in the same manner, and their motion is alternated and made simultaneous by means of a bevel-gear J and pinions K, which are mounted upon the shaft I, so as to engage the gear J upon opposite sides of the center. It will be seen that by this construction when one of the pedals H is pressed down it will partially rotate its shaft I and the bevel-pinion K, which is fixed upon it. This will act to rotate the horizontal bevel-wheel J and will turn the pinion K of the opposite pedal in the opposite direction, thus raising one pedal when the other is depressed. These pedals are so arranged as to be actuated alternately, and each one is returned when its fellow is depressed.

It will be manifest that spring connections may be substituted for the gears and pinions, in which case each crank or pedal arm will be raised independently by its own spring, and the two may then be operated together or alternately, as may be desired.

S are supplemental vertically-disposed rack-bars having teeth upon the outer ends which are adapted to engage the pinions D or corresponding ones upon the shaft or axle A. At the lower ends of these rack-bars S are journaled small rollers T, adapted to form contact with the ground. Whenever, by reason of irregularities of the surface or protuberances passed over, the wheels B sink into such depressions so that the rollers T come in contact with the ground, the rack-bars S will be forced upward, and power will thus be applied to rotate the pinions D, so that the irregularities of the road itself will provide a certain additional power, produced by the weight of the machine and rider, which power is transmitted through the pinions directly to the driving shaft or axle. It will be understood that a similar connection of rack-bar and pinion could be connected with the saddle and operated by the vertical movement of the latter.

In order to control and check the movement of the machine whenever desired, I have shown a brake-bar L' extending across the vehicle, having a pair of rollers L, connected by short arms $a$ $a'$, one above and one below each end of the brake-bar, which latter is adapted to slide back and forth on the frame and is operated by means of a knee-lever M, one arm of which connects with the brake-bar, while the other arm is fulcrumed to a stationary bracket upon the frame. The meeting angle of the knee-levers has a pedal-piece N, upon which the foot of the operator may be placed to depress it and thus apply the brake at will. From this description it will be seen that pressure upon the pedal N acts through the toggle to force the brake-bar back and press the two rollers against each wheel. There being two rollers, a direct pressure on the bar applies both, and as one is above and the other below the brake-bar undue strain upon the latter is prevented.

Having thus described my invention, what I claim as new, and desire to secure by Letters Patent, is—

1. A vehicle having a wheel-shaft, pinions mounted thereon with clutch mechanisms whereby rotation in one direction will engage them with the shaft, and rotation in an opposite direction will disengage them therefrom, and vertically-movable rack-bars engaging pinions upon said shaft and having wheels journaled in their lower ends to form contact with the ground when passing over irregularities of the surface whereby the racks transmit additional power to the shaft.

2. A vehicle having a wheel-shaft provided with pinions, and vertically-movable rack-bars engaging said pinions and having their lower ends to form contact with the ground when passing over irregularities of the surface whereby additional power is applied through the racks to the wheel-shaft.

3. In a vehicle, a vertically-slidable bar having one end to contact with the ground when passing over irregularities of the surface and having the opposite portion so connected with the wheel-shaft that the movement of the bar, due to its contact with the irregularities of the surface, will transmit additional power to the shaft.

4. A vehicle having a wheel-shaft, pinions mounted thereon with clutch mechanisms whereby rotation in the forward direction will engage them with the shaft, and rotation in the opposite direction will disengage them therefrom, toothed rack-bars engaging the pinions, and mechanism whereby they are reciprocated so as to apply power to rotate the wheel-shaft, and supplemental vertically-movable rack-bars engaging pinions upon the wheel-shaft and having wheels journaled in their lower ends to form contact with the ground when passing over irregularities of the surface whereby the supplemental racks are moved and power applied through them to the wheel-shaft.

5. In a vehicle, a wheel-shaft, and mechanism through which power is applied to rotate the wheel-shaft in a forward direction, in combination with a brake-bar extending across the vehicle, a pair of rollers, one above and one below each end of the brake-bar, oppositely-extending arms connecting the brake-bar with the rollers, knee-levers one of which has a fixed connection on the frame while the other connects with the brake-bar, and a foot-piece at the junction of the knee-levers whereby the brake may be applied.

In witness whereof I have hereunto set my hand.

JOHN GAMBETTA.

Witnesses:
S. H. NOURSE,
JESSIE C. BRODIE.